Jan. 29, 1963   R. S. RANDALL   3,075,625
STACK ALIGNING CHUTE
Filed Feb. 17, 1959   2 Sheets-Sheet 1
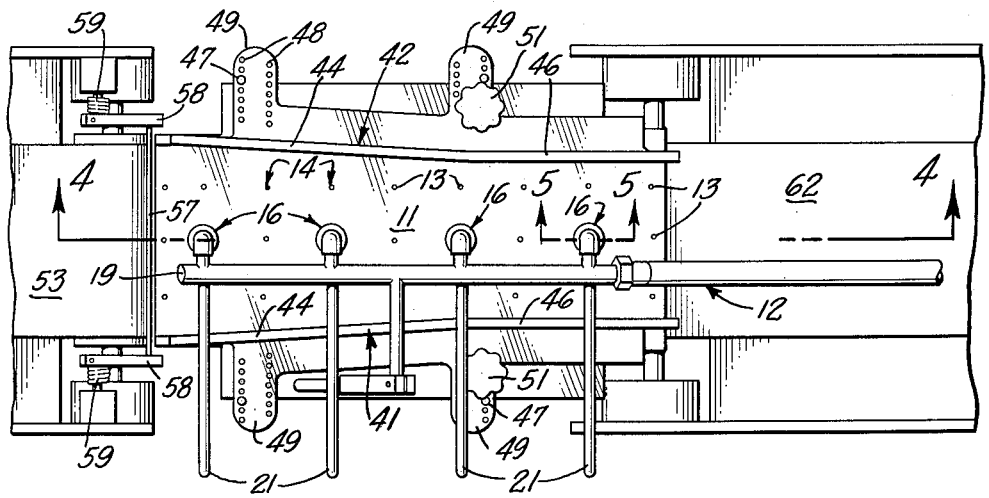
FIG_1_
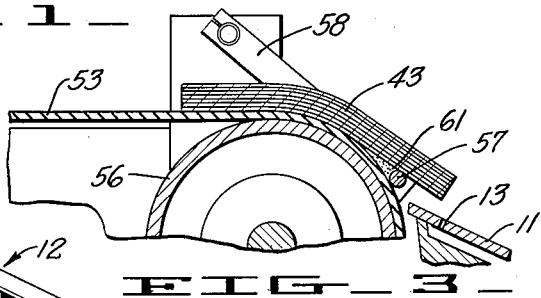
FIG_3_
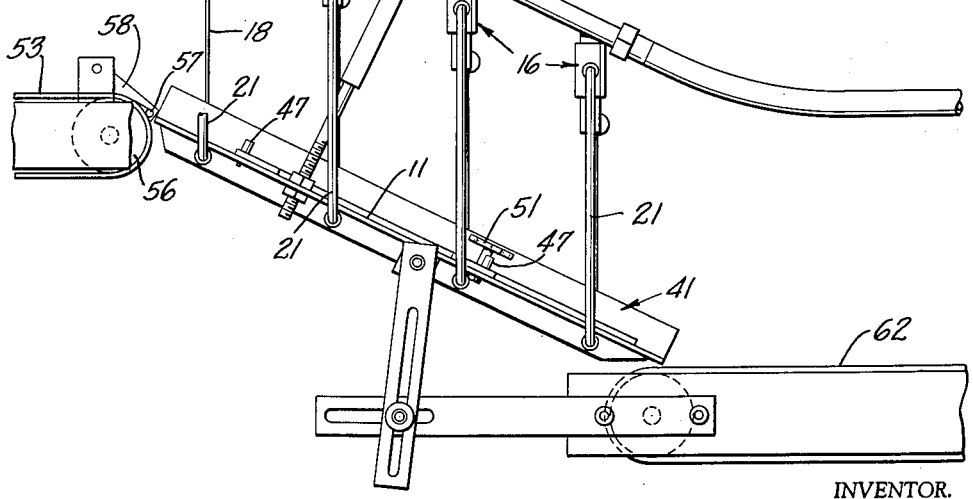
FIG_2_
INVENTOR.
Ralph S. Randall
BY
A. Schapp.
ATTORNEY.

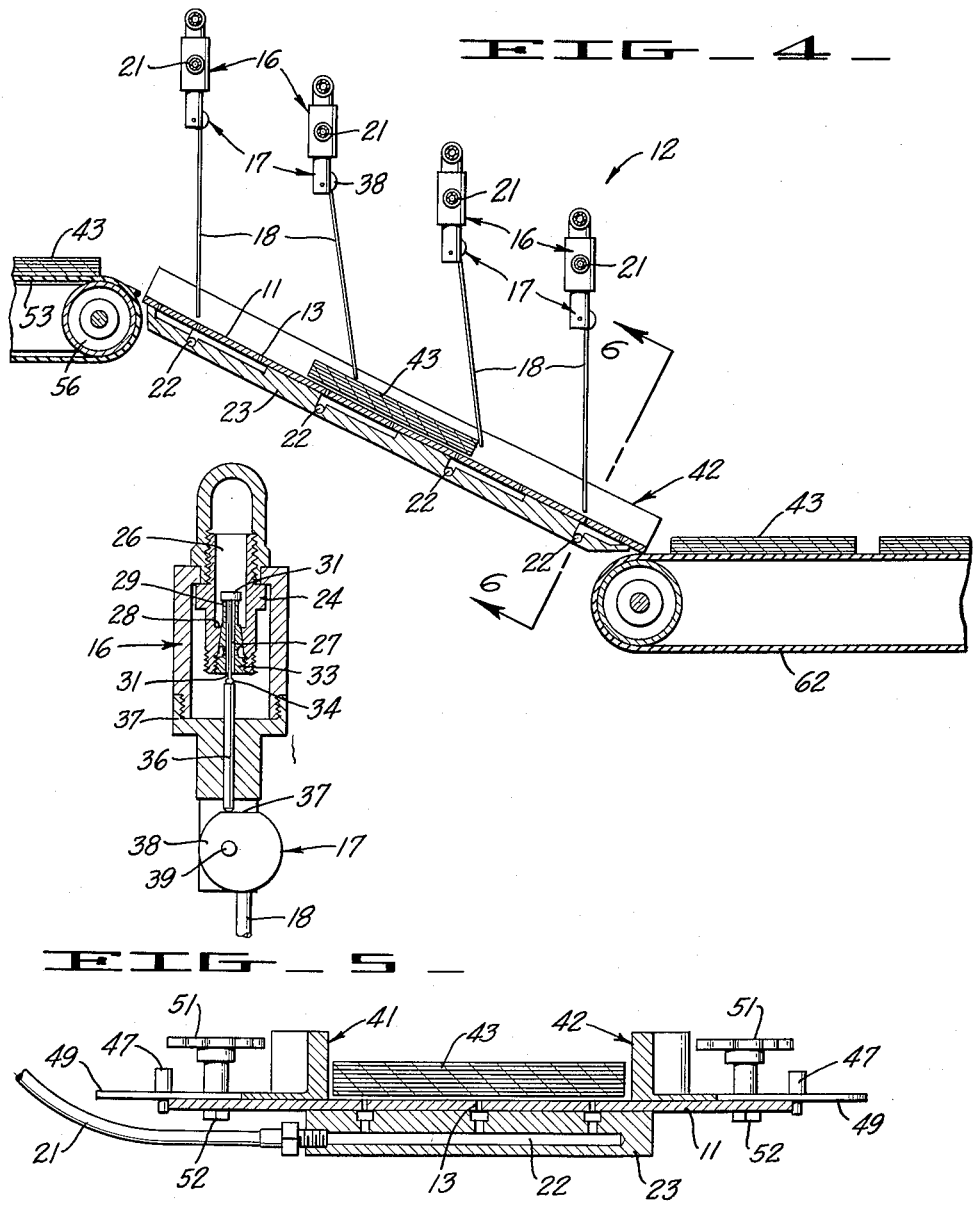

# United States Patent Office 3,075,625
Patented Jan. 29, 1963

3,075,625
STACK ALIGNING CHUTE
Ralph S. Randall, 3380 20th St., San Francisco, Calif.
Filed Feb. 17, 1959, Ser. No. 793,735
4 Claims. (Cl. 193—43)

The present invention relates to stack aligning chutes, and has reference to devices for transporting articles in one at a time order, and more particularly to apparatus for aligning the articles with respect to their direction of travel so as to deliver the articles in an aligned row.

This invention is particularly suited for use in connection with machines for packaging stacks of sliced foodstuffs, of the nature disclosed in my co-pending application, Serial Number 758,399, now Patent No. 2,986,858, June 6, 1961, for a Bagging and Packaging Machine. These machines automatically insert the stacks of sliced meat or cheese into a plastic bag for further evacuating and sealing operations.

To operate effectively, the bagging machine must receive the stacks in an aligned row, usually on a belt conveyor. Manually placing the stacks on the belt with the required accuracy is tedious and expensive, in that it requires numerous operators and a long feed belt. This is because of the high operating speed and large capacity of the bagging machine, which requires a rapidly moving conveyor belt.

Fewer operators will be required if the stacks can be placed somewhat haphazardly on a conveyor belt, either by hand or by automatic slicing and weighing machinery, and the stacks thereafter brought into the necessary alignment.

In my above-mentioned co-pending application, the stacks are aligned on the feed belt by means of large freewheeling disks which engage the edges of the stacks to push them over and align the edges with the direction of travel. While effective with certain foods, such as hard cheese, soft and greasy foods, such as boiled ham, are difficult to slide on the belt and the disks may merely distort the edges of a stack without bringing it into alignment.

The present invention contemplates placing the stacks on a receiving belt in more or less hapzard order and then transferring them onto the bagging machine feed belt in a single row, the transfer means acting to re-orient the stacks so that their side edges are aligned with the direction of movement of the feed belt.

It is therefore, a principal object of the present invention to provide a transfer device which will receive a stream of articles, such as stacks of sliced food, in misaligned order, and which will deliver the articles in tandem order with their side edges aligned with each other and with the direction of travel.

Another object of the present invention is the provision of a transfer device of the character described, in the form of an inclined chute and in which the transfer and aligning operations are carried out by the force of gravity.

A further object of the present invention is to provide an inclined article transfer chute in which the articles are held out of contact with the walls and bottom of the chute in order to obviate any tendency of soft or greasy articles to stick to the chute.

A still further object of my invention is to provide an inclined chute of the character described in which the articles are floated on a cushion of air during their progress through the chute.

Additionally, it is proposed to provide a mechanism for furnishing the cushion of air only at the portion of the chute the article is passing in order to conserve air and reduce the required pressure and volumetric capacity of the air compressor.

And finally, it is proposed to provide an article actuated valve structure effective to provide air only at the location over which the article is passing, the valve structure and actuating means being freely operable so as not to impede or deflect the article in its course through the chute.

Further objects and advantages of my invention will be apparent as the specification proceeds, and the new and useful features of my Stack Aligning Chute will be fully defined in the claims hereto attached.

The preferred form of my invention is illustrated in the accompanying drawings, forming part of this application, in which:

FIGURE 1 is a plan view of a stack aligning chute constructed in accordance with my invention and shown in operative association with portions of receiving and feed belt conveyors;

FIGURE 2 is a side elevational view of the structure of FIGURE 1;

FIGURE 3 is an enlarged fragmentary cross-sectional view of the end of the receiving conveyor and the upper end of the chute showing details of a device for stripping the stacks of food from the conveyor belt;

FIGURE 4 is a longitudinal sectional view taken substantially on the line 4—4 of FIGURE 1;

FIGURE 5 is an enlarged vertical cross sectional view of a valve and associated actuator, the view being taken substantially on line 5—5 of FIGURE 1; and FIGURE 6 is a cross sectional view of the chute taken substantially on line 6—6 of FIGURE 4.

While I have shown only the preferred form of my invention, it should be understood that various changes or modifications may be made within the scope of the claims hereto attached, without departing from the spirit of the invention.

Referring to the drawings in detail, the article transfer chute of the present invention consists basically of an inclined plate 11 and means 12 providing an air blast at the upper surface of the plate for supporting articles in spaced relation above the plate during their passage thereover.

Preferably, as here shown, the air blast is directed upwardly through perforations 13 formed in the plate 11, although it is contemplated that suitable air blasts might be directed inwardly from the sides of the chute, or in some other comparable manner. Whatever the form of air blast used, it should provide a cushion of air under the article sufficient to hold the article up out of contact with the plate 11.

In order to conserve air, the means 12 is designed to supply air under pressure to the perforations 13 only when an article is passing over the perforations. This intermittent action permits the use of a smaller capacity compressor than would otherwise be required.

The perforations 13 can be supplied with air from a single control valve, in which case the valve would be designed to open as the article enters the chute and close as the article is discharged.

It has been found that further savings in air can be obtained by forming the perforations 13 in a plurality of rows 14 arranged transversely, that is, normal to the direction of incline of the plate 11. The air is then supplied to a row, or to a group of adjacent rows, by a plurality of valves 16 which have actuating means 17 located at the rows being controlled and operative to open the correct valve whenever an article is passing thereover.

With this arrangement, the air blast is provided to the rows of perforations sequentially, the blasts being timed to provide support for the article as it passes over each row.

The actuating means 17 may be of any suitable type which will not interfere with or impede the article. Photo-electric cells or micro-switches connected to solenoid operated valves could be used for this purpose. However, it is desired to provide a purely mechanical actuating means in order to eliminate electrical components and their attendant operational difficulties.

The means 17, as here shown, includes an actuating member or rod 18 extending into overlying relation to the row to be supplied with air, in the path of the article as it passes through the chute. This rod is adapted to operate a mechanically actuated valve 16 which is connected to a source of air under pressure (not shown) through a header 19. A conduit 21 channels the air from the valve 16 to manifold passages 22 formed in a block 23 under the inclined plate 11.

The valve 16 is best shown in FIGURE 5 of the drawings and includes a housing 24 having a vertical inlet passage 26 at its upper end and a communicating outlet passage 27 at its lower end. The passage 27 is smaller than passage 26 so as to provide a shoulder 28 within the housing.

Carried on the shoulder 28 is a horizontal valve seat 29 located centrally of the housing 24. A valve member 31 rests on the valve seat 29 and is displaceable upwardly by means of a thin stem 32 passing downwardly through the outlet passage 27. A guide member 33 for the stem 32 may be threaded into the bottom end of the housing 24.

An enlarged knob 34 is formed at the lower end of the stem 32 and rests upon the upper end of an actuating rod 36 which is axially aligned with the stem. An outer housing 37 is supported on the valve housing 24 and provides a bore in which the rod 36 may reciprocate.

The lower end of the rod 36 rests on a cut out portion 37 of a cam 38 which is eccentrically journaled on a pin 39 supported by housing 37. The feeler rod 18 is attached to the cam and, upon displacement to the right as viewed in FIGURE 5, rotates the cam sufficiently to displace the actuating rod 36 upwardly and open the valve. As soon as the article passes the end of the feeler 18 the parts will return to the position shown under the force of gravity, and the air pressure on the upper side of the valve member 31.

It will be noted that no springs are needed in either the valve or the actuating means. This, of course, eliminates problems of the springs breaking or weakening, and further permits the feeler to move very easily so as not to interfere with the progress of the article.

As an important feature of the present invention, the article transfer chute is adapted to align articles into a single row as they pass over it. This is here accomplished by the provision of sidewalls 41 and 42 which are mounted in spaced relation on the plate 11 to define a trough therewith, the plate 11 providing the bottom wall.

The upward air blast through the perforations 13 serves to keep the article from substantial contact with sidewalls 41 and 42, as well as supporting it above the bottom wall 11. This is best shown in FIGURE 6 of the drawings where it may be seen that the sidewalls have a spacing slightly exceeding the width of the article (in this case a stack 43 of sliced food).

As the air blast strikes the under side of the stack, it is deflected to the sides and passes upwardly between the stack sides and the sidewalls. This provides a cushioning effect and tends to keep the stack centered between the sidewalls.

The spacing of the sidewalls 41 and 42 is somewhat wider at the upper end of the plate 11 in order to receive misaligned articles. As the stack is floated down the chute, the walls converge and bring it into fore and aft alignment into a single row. At the same time, rectangular stacks will be re-oriented and straightened out so that their sides will be aligned with their direction of travel.

In their preferred form, the sidewalls 41 and 42 have a configuration providing angularly related sections 44 and 46. The sections 44 converge from the top of the chute for about two-thirds of the length of the chute and blend into the sections 46 which are substantially parallel.

Means is provided for varying the spacing of the sidewalls 41 and 42, so as to accommodate stacks of different width. As here shown, this means consists of pins 47 engaged in one of a laterally extending line of closely spaced holes 48 formed in ears 49 attached to the sidewalls.

The pins 47 engage the side edges of the plate 11 and serve to accurately position the sidewalls. A knurled knob 51, threaded on a bolt 52 passing through lateral slots in the ears 49 and plate 11, may then be tightened down to hold the sidewalls in place.

In operation, stacks 43 of sliced meats or cheese are placed on the belt 53 of a receiving conveyor 54, in random order. As the belt 53 passes around the tail pulley 56, the stacks engage a scraper bar 57 which is carried on arms 58 and pressed against the belt by springs 59.

The scraper bar 57 serves to free sticky meats such as boiled ham, or the like, from the belt. In this connection, note that when such meats are being packaged, a layer of fat will accumulate on the belt and be piled up in the form of a wedge 61. This wedge provides smooth translation of the bottom of the stack from the belt and over the scraper bar without the bottom slice hanging up.

As the stack passes over the scraper bar, it will strike and deflect the first of the feeler members 18, turning on the first valve 16 and providing a blast of air through the perforations in the first two rows. In continuing down the chute, the stack will actuate successive valves and maintain a cushion of air under the stack at all positions.

The converging sidewalls 41 and 42 will bring the stack into the desired alignment as it passes down the chute and is discharged onto the feed conveyor 62 of the packaging machine.

During its entire journey down the chute, the article will be kept out of substantial contact with the side or bottom walls, thus preventing hanging up, toppling of the stack, or fouling of the chute. In this connection it should be noted that the speed of the article through the chute is very fast. In fact, it is so fast that the action cannot be seen by the unaided eye.

Slow motion movies and the fact that little, if any grease or moisture is left on the chute provide the evidence that the article does not rub against the chute.

I claim:

1. An article transfer chute comprising an inclined bottom wall formed with a plurality of rows of perforations normal to the direction of incline, means providing an air blast upwardly through said rows of perforations in sequence for supporting articles in spaced relation above said wall in their passage thereover, the sequence of said air blasts being timed to provide air blasts through the perforations of each row which an article is to pass over immediately prior to and during such passage, and a plurality of valves connected to said means for controlling said air blasts, each of said valves having an actuating member mounted above one of said rows of perforations in position for actuation by an article passing over such row so as to supply the air blast to the row only when actuated by an article, and a pair of vertical sidewalls mounted in spaced relation on said bottom wall to define an inclined trough, said sidewalls being spaced apart by a distance slightly exceeding the width of the article whereby said air blast will pass upwardly between the sides of the article and said sidewalls and hold the article out of contact with said side walls during its passage therebetween.

2. An article transfer chute comprising an inclined bottom wall formed with a plurality of rows of perforations normal to the direction of incline, means providing an air blast upwardly through said rows of perforations in sequence for supporting articles in spaced relation above said wall in their passage thereover, the sequence of said air blasts being timed to provide air blasts through the perforations of each row which an article is to pass over immediately prior to and during such passage, and a plurality of valves connected to said means for controlling said air blasts, each of said valves having an actuating member mounted above one of said rows of perforations in position for actuation by an article passing over such row so as to supply the air blast to the row only when actuated by an article, and a pair of vertical sidewalls mounted in spaced relation on said bottom wall to define an inclined trough, said sidewalls being spaced apart by a distance slightly exceeding the width of the article whereby said air blast will pass upwardly between the sides of the article and said sidewalls and hold the article out of contact with said sidewalls during its passage therebetween, said sidewalls being formed at the upper end of said bottom wall with a spacing greater than the width of the article so as to receive the same in non-aligned relation, the said sidewalls converging toward the lower end of said bottom wall to a spacing slightly exceeding the width of said article and having such latter spacing over a portion of their length.

3. A chute for transferring and aligning articles comprising an inclined plate providing a bottom wall, a pair of sidewalls mounted in spaced relation on said bottom wall to define an inclined trough, said sidewalls being formed with angularly related portions providing a spacing at the upper end of said trough wide enough to receive articles in misaligned tandem relation and converging downwardly of the incline to afford a spacing over the lower portion of said trough slightly exceeding the width of said articles, means on said sidewalls and said bottom wall for varying the spacing between the sidewalls to accommodate different sizes of articles, said means comprising a pin engageable in one of a lateral row of perforations in said sidewalls and abutting the side edge of said inclined plate together with a manually operable screw handle for locking said sidewalls against relative movement on said bottom wall, said bottom wall being formed with a series of lateral rows of perforations, a plurality of manifolds communicating with said perforations, valves adapted for connection to a source of air under pressure and connected to each of said manifolds, and actuating members overlying the rows of perforations and connected to said valves for operating the latter to supply air to said manifolds when displaced by an article passing over the perforations connected to such manifold.

4. A device for transferring stacks of slices of food comprising an inclined trough having a bottom wall formed with a plurality of transverse rows of perforations and having spaced upstanding side walls, a belt conveyor having a tail pulley at the upper end of said trough and formed to discharge the stack into said trough in spaced relation above said bottom wall, and means on said bottom wall adapted for connecting said perforations to an air compressor whereby blasts of air rising through said perforations will support the stacks out of contact with said trough in their passage thereover from said belt conveyor, said means including a plurality of feelers overlying said trough in the path of the stacks and formed to connect each of said rows to said air compressor only when a stack displaces the feeler for a particular row as it approaches and passes over such row.

References Cited in the file of this patent
UNITED STATES PATENTS

| | | |
|---|---|---|
| 662,574 | McGary | Nov. 27, 1900 |
| 756,600 | Dodge | Apr. 5, 1904 |
| 1,893,903 | Mullins | Jan. 10, 1933 |
| 2,517,388 | Daves | Aug. 1, 1950 |
| 2,601,514 | Goodban | June 24, 1952 |
| 2,651,549 | Ross | Sept. 8, 1953 |
| 2,678,237 | Allander | May 11, 1954 |
| 2,778,691 | Hazel | Jan. 22, 1957 |
| 2,785,928 | Hanson | Mar. 19, 1957 |
| 2,805,898 | Willis | Sept. 10, 1957 |
| 2,813,637 | Perry et al. | Nov. 19, 1957 |
| 2,881,000 | Kephart | Apr. 7, 1959 |